Figure 1:
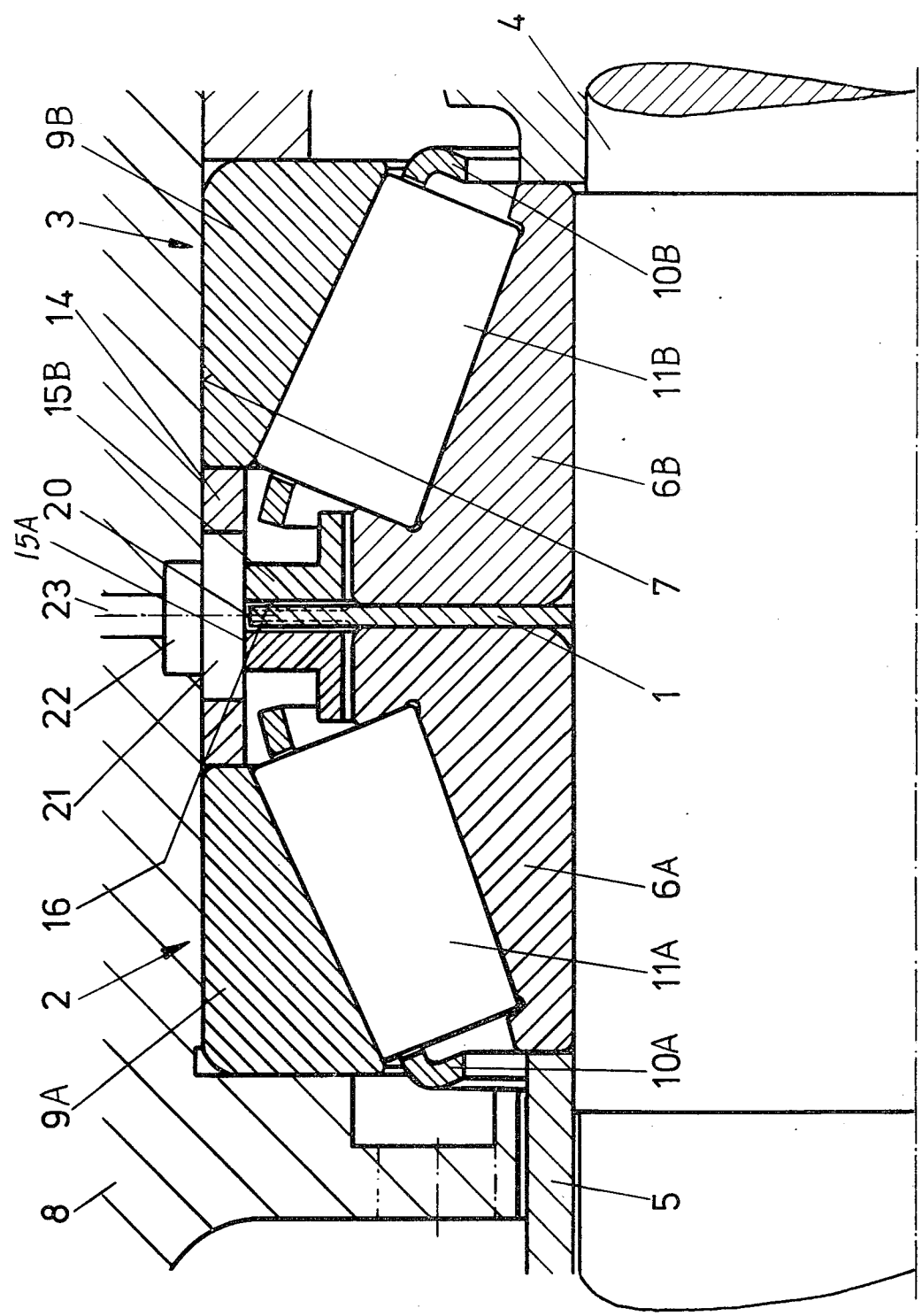

United States Patent [19]

Schiemann

[11] 4,120,541
[45] Oct. 17, 1978

[54] LUBRICATING DEVICE

[75] Inventor: Siegfried Schiemann, Schweinfurt, Fed. Rep. of Germany

[73] Assignee: SKF Kugellagerfabriken GmbH, Schweinfurt, Fed. Rep. of Germany

[21] Appl. No.: 844,138

[22] Filed: Oct. 20, 1977

[30] Foreign Application Priority Data

Oct. 22, 1976 [DE] Fed. Rep. of Germany ... 7633126[U]

[51] Int. Cl.² ............................................. F16C 33/66
[52] U.S. Cl. .................................... 308/187; 308/214
[58] Field of Search .................... 308/85 R, 127, 121, 308/122, 187, 212, 213, 214

[56] References Cited

U.S. PATENT DOCUMENTS

| | | | |
|---|---|---|---|
| 2,447,838 | 8/1948 | Bergstrom et al. | 308/214 |
| 2,867,481 | 1/1959 | Hornbostel | 308/187 |
| 3,746,407 | 7/1973 | Stiles et al | 308/187 |

Primary Examiner—Trygve M. Blix
Assistant Examiner—Charles E. Frankfort
Attorney, Agent, or Firm—Daniel M. Rosen

[57] ABSTRACT

A lubricating device for use in a rolling bearing having a lubricating supply disk rotating within a narrow space forming a communicating channel to the rolling bearing surfaces, and a retaining ring mounted in a non-rotating manner about the disk to form the narrow space communicating channel.

10 Claims, 2 Drawing Figures

LUBRICATING DEVICE

The present invention relates to a lubricating device for a rolling bearing carrying a rotating shaft.

In conventional lubricated bearings, the bearing is mounted in the bore of a housing such that an annular space filled with lubricant is available in the housing bore near the outer race of the rolling bearing. More specifically, a disk rotating with the shaft forms, by means of axially spring loaded slip rings, a rubbing radial sliding clearance, through which a lubricant, such as lubricating oil is supplied radially inwards from the ring space into the bearing. A disadvantage of this new device is that a relatively small amount of lubricant passes through the rubbing clearance and penetrates into the rolling bearing. Penetration is particularly noticeable at high rotational speeds of the shaft when a centrifugal force acts on the lubricant, which prevents a radial, inwardly directed flow of the lubricant through the sliding clearance. Also, wear particles are formed at the spring loaded sliding surfaces, which may also penetrate into the bearing with the lubricant and cause damage to the bearing.

It is therefore an object of the present invention to develop an improved lubricating device wherein a sufficient amount of lubricant is supplied to the bearing, even at high rotational speeds of the shaft, without damaging wear taking place.

It is a further object of the present invention to provide an improved lubricating device which is economically producible and relatively simple to mount.

The foregoing objects are achieved by employing a lubricant supply disk firmly attached to the shaft at its bore. At its outer periphery the disk communicates with an annular space and a lubricant supply surface is provided on the side of the disk facing the bearing. A ring is held stationary (non-rotating) in the housing. The ring keeps the lubricant supply surfaces at a narrow distance from the corresponding counter surfaces and forms at its inner diameter an axial slot or axial holes to supply the lubricant to the bearings. The lubricant supply surface or the counter surface is equipped with grooves, inclined with respect to the radius or spirally shaped for hydrodynamic pumping of the lubricant in the inward direction.

In accordance with the invention, the sides of the lubricant supply disk include a lubricant supply surface facing a rolling bearing with a corresponding ring. Therefore, two rolling bearings mounted on the shaft can be provided with lubricant individually with a single lubricant supply disk. Thus, according to the invention, the rings on both sides of the lubricant supply disk may be fastened to each other at their outer edge, e.g. with screws, whereby radial openings from the annular space to the counter surfaces of both rings are formed.

The invention further includes a radial sleeve mounted in the bore of the housing and containing passages to the annular space, the ring structure being mounted so that they may be axially displaced in the bore of the sleeve. Thus, it is not necessary to provide elements for the axial fastening of the rings which would make production more expensive, in the housing or in the bore of the sleeve.

Figure 2:
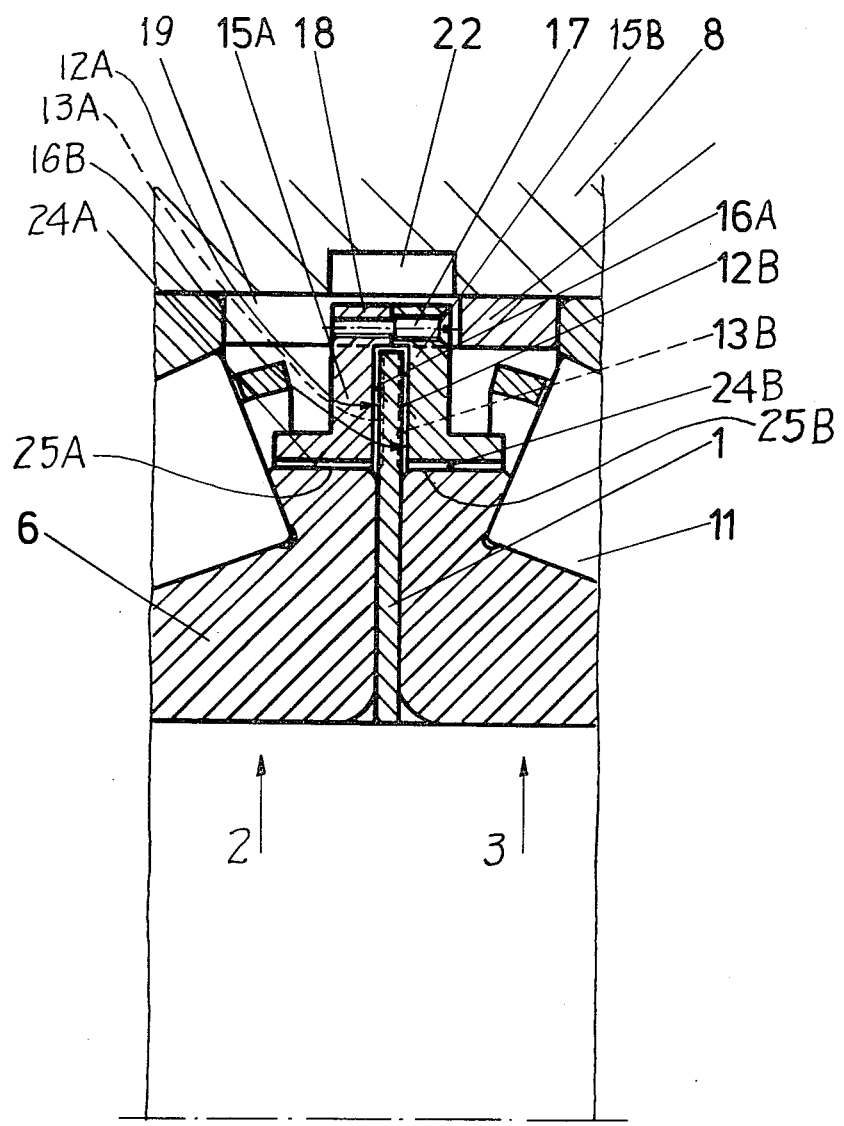

The foregoing brief description will become more apparent from the following more detailed description and accompanying drawings, wherein FIG. 1 illustrates a section through a lubricating device according to the invention, and FIG. 2 shows a section in another plane, through the lubricating device shown in FIG. 1, this plane being through a location where the two rings are fastened to each other.

Referring now to FIGS. 1 and 2, a lubricant supply disk 1 is mounted on a shaft 4 between two tapered roller bearings 2 and 3, mounted side by side. The lubricant supply disk 1 is clamped by means of an axially loaded shaft sleeve 5 between the inner races 6 of both tapered roller bearings 2 and 3. Each tapered roller bearing consists of an inner race 6A, 6B, an outer race 9A, 9B, fitting in the bore 7 of the housing 8 and tapered rollers 11A, 11B, guided by the bearing cage 10A, 10B. The lubricant supply disk 1 contains a lubricant supply surface 12A and 12B on respective sides facing the tapered roller bearings 2 and 3. The lubricant supply surfaces 12A nd 12B are hydrodynamically formed, including grooves inclined with respect to the radius or spirally shaped.

Between the outer races 9 of both tapered roller bearings a sleeve 14 is fitted into the bore 7 of the housing 8, e.g. by press fit.

The lubricant supply disk 1 is located between two rings 15A and 15B, so that both lubricant supply surfaces 12A and 12B are at a narrow distance from the respective counter surfaces 16A and 16B of the corresponding rings 15A and 15B. It is clearly shown in FIG. 2 that both rings 15A and 15B, near their outer diameter, are attached to each other by screws 17 in radial protrusions 18. The protrusions 18 of both rings fit into a slot 19 of the sleeve 14, so that both rings are held against rotation in the housing 8. The rings can be moved axially in the bore of the sleeve 14.

At the outer diameter of the rings 15A and 15B are radial openings 20 which, by means of the radial passages 21 in the sleeve 14, form a communicating connection between the counter surfaces 16A and 16B, and the annular space 22 in the bore 7. The annular space 22 can, by means of the inlet channel 23 in housing 8, be supplied with lubricant.

Both rings 15A and 15B form, at their inner diameter with their respective shoulder surfaces 25A and 25B of the corresponding inner ring, a passage such as the axial slots 24A and 24B, which are connected to the radial slot formed by the lubricant supply surface and the counter surface. Through this slot the lubricant is discharged near the tapered rollers 11A and 11B.

In operation the lubricant is transmitted from the annular space 22, containing a supply of lubricant, through the passages 21 and the openings 20 to the slot formed between the lubricant supply surfaces 12A, 12B and the counter surfaces 16A, 16B. Because the lubricant supply disk 1 rotates in a given direction with the shaft 4, a relative motion is generated between the lubricant supply surfaces 12A, 12B and the counter surfaces 16A, 16B, of the corresponding rings 15A, 15B, narrowly spaced from the surfaces 12A, 12B. As a result, lubricant is pumped, through the hydrodynamically acting inclined or spiral grooves 13A, 13B from the outer diameter of the lubricant supply disk radially inwards into the connecting axial slot 25A, 25B between rings 15A, 15B and the respective shoulder surface 24A, 24B of the corresponding inner race 6A, 6B. The lubricant flows through this axial slot 25A, 25B and is discharged near the tapered rollers 11A and 11B to lubricate the tapered roller bearings 2, 3.

The lubrication device according to the invention advantageously permits a sufficient amount of lubricant to be continuously transmitted into the tapered roller bearing, whereby no damaging wear occurs in the lubricating device.

The concept of the present invention may be employed not only for pairs of mounted rolling bearings, but also for single rolling bearings, whereby the lubricant supply disk has a lubricant supply surface only on the side facing the rolling bearing. In addition, it is possible to increase the pumping efficiency by producing hydrodynamically pumping inclined or spiral grooves in the axial direction of the bearing in the surface 24A, 24B of the inner race 6A, 6B or in the corresponding surface of ring 15A, 15B.

Also, it is not necessary for the lubricant supply surface 12A, 12B of the disk 1 to be mounted vertically on the shaft 4, but may together with the corresponding surface of the respective ring be made tapered, so that the radial inner end of the slot between the lubrication supply surface and the counter surface ends near the corresponding bearing race. Instead of the axial slot the rings 15A, 15B may have axial holes near the bore thereof to transmit the lubricant to the rolling bearing.

Further alternatives, modifications, substitutions, additions and deletions will be apparent to those skilled in the art as falling within the spirit and scope of the present invention.

What is claimed is:

1. A lubricating device for lubricating the bearing surfaces of a rolling bearing supporting a rotating shaft, comprising a disk having a facing surface, said disk coupled to and rotating with said shaft, a fixed support having a counter surface surrounding said disk so as to form a relatively narrow spacing between said disk facing surface and said counter surface, said support including a passageway from said counter surface to said bearing surface, a source of lubricant, and means passing said lubricant to said narrow spacing, and hydrodynamic means for providing a hydrodynamic force to said lubricant for forcing said lubricant from said narrow space to said bearing surface.

2. The lubricating device of claim 1 wherein a hydrodynamic surface is provided on both sides of said disk.

3. The lubricating device of claim 1 wherein said fixed support is a pair of rings mounted on opposite sides of said disk, and non-rotating means for attaching said rings to each other outside of said disk.

4. The lubricating device of claim 1 wherein said hydrodynamic means comprises grooves on said disk facing surface.

5. The lubricating device of claim 1 wherein said hydrodynamic means comprises grooves on said counter surface.

6. Lubricating device for a rolling bearing, mounted in the bore of a housing and carrying a rotating shaft, comprising, near the rolling bearing outer race, an annular space filled with lubricant in the housing bore, a lubricant supply disk attached at its bore to said shaft, said disk communicating at its outer periphery with said annular space and having a lubricant supply surface on the side facing the rolling bearing, a ring held stationary without torsion in said housing, said ring mounted in such a manner that the lubricant supply surface is at a narrow distance from a corresponding counter surface of said ring, the inner diameter of said ring forming a passage to supply lubricant to said rolling bearing.

7. Lubricating device according to claim 6 wherein said rolling bearing includes two rolling bearings, a lubricant supply surface is on both sides of said supply disk, facing each of the rolling bearings, and including a corresponding ring for each of the rolling bearings.

8. Lubricating device according to claim 7 wherein said rings are fastened to each other on both sides of said supply disk, at the outer edge of said rings, whereby radial openings from said annular space to said counter surfaces of said rings are formed.

9. Lubricating device according to claim 6 wherein said ring is contained within a sleeve fastened in the bore of said housing in a manner such that radial passages to said annular space are formed.

10. Lubricating device according to claim 9 wherein said ring is axially displaceable in the bore of said sleeve.

* * * * *